Figure 1:
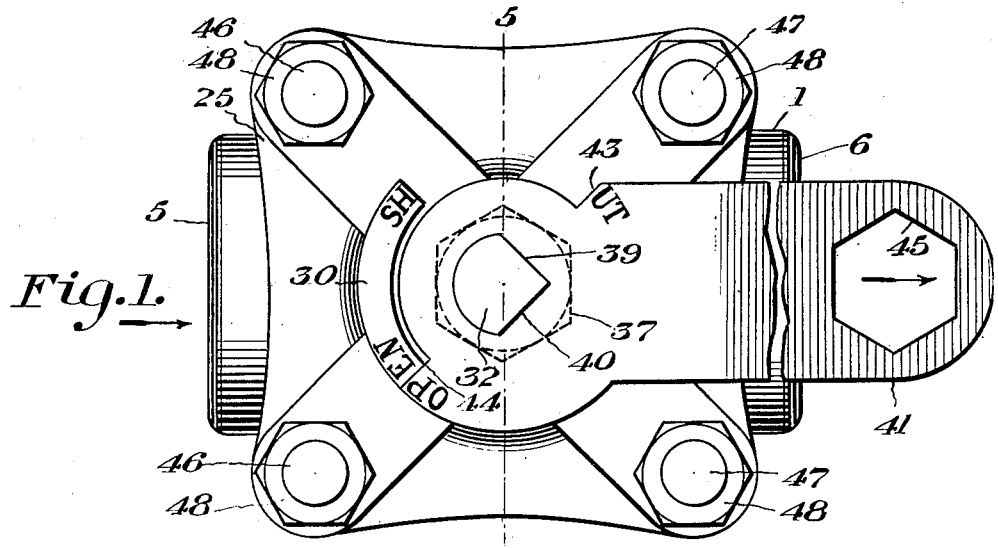

April 28, 1936.    A. G. HEGGEM    2,039,220

VALVE

Filed Aug. 19, 1935    3 Sheets-Sheet 1

Inventor:
Alfred G. Heggem,
By Smith, Michael & Gardiner,
Attorneys.

April 28, 1936.  A. G. HEGGEM  2,039,220

VALVE

Filed Aug. 19, 1935  3 Sheets-Sheet 2

Inventor:—
Alfred G. Heggem,
By Smith, Michael & Gardiner,
Attorneys

April 28, 1936.  A. G. HEGGEM  2,039,220

VALVE

Filed Aug. 19, 1935  3 Sheets-Sheet 3

Inventor:—
Alfred G. Heggem,
By Smith, Michael & Gardiner,
Attorneys.

Patented Apr. 28, 1936

2,039,220

UNITED STATES PATENT OFFICE 2,039,220

VALVE

Alfred G. Heggem, Tulsa, Okla.

Application August 19, 1935, Serial No. 36,885

16 Claims. (Cl. 251—91)

My invention relates to valves, and has particular reference to an improved rotary valve for controlling the flow of fluids operating under relatively high pressures, such as the pressure frequently encountered in oil and gas wells, pipe lines and similar high pressure installations.

It is an object of my invention to provide a valve including a valve body or casing having inlet and outlet ports communicating with a valve chamber, and a valve core rotatable within said chamber to open or closed position to effectively control the flow of fluid through the valve.

It is an object of my invention to provide a valve including a rotatable core member having a passage extending therethrough which, when brought into alignment with the inlet and outlet openings, permits the flow of fluid through the valve, said core having an imperforate surface registrable with one of the openings which, when brought into contact with a valve seat surrounding said opening, will effectively seal the opening against the passage of fluid therethrough.

It is an object of my invention to provide a valve including a rotary core member having a passage extending therethrough and having oppositely disposed imperforate surfaces, one of which may be brought into contact with a valve seat surrounding the outlet opening of the valve body or casing and the other of which receives the pressure of the fluid entering the valve body or casing through the inlet opening, which pressure is effective to force the first mentioned imperforate surface into intimate contact with the valve seat surrounding the outlet opening to effectively seal said opening against the passage of fluid therethrough.

It is a further object of my invention to provide a valve of the above mentioned character having novel means for adjusting the valve core with respect to the valve seat to compensate for wear of the valve core and/or seat to thus insure a tight seating of the valve core with respect to the valve seat.

It is a further object of my invention to provide a valve of the above mentioned character including a two part valve casing, the lower section of which is provided with inlet and outlet openings and a valve chamber communicating therewith, and the upper or cover section of which is provided with means for rotating the valve core, and to associate with the two part casing a positive means for adjusting and clamping the upper section in various angular positions with respect to the lower section to effect the proper seating of the valve core with respect to the valve seat and to permit subsequent adjustment of said valve core with respect to said seat to compensate for wear of said valve and/or seat due to repeated opening and closing of the valve.

It is a further object of my invention to provide a two part valve body or casing, the upper and lower sections of which are provided with circular cooperating concave and convex surfaces, whereby the sections are capable of universal angular adjustment, and wherein the angular position of the upper section with respect to the lower section determines the relative position of the valve core with respect to the valve seat within the lower section, means being provided for permitting the adjustment of the sections and for securely maintaining the sections in the desired angular position.

It is a still further object of my invention to provide a valve which is simple in construction and operation, easy to assemble and disassemble, strong and durable, capable of withstanding relatively high fluid pressures, and highly efficient in the purposes for which designed.

Figure 2:
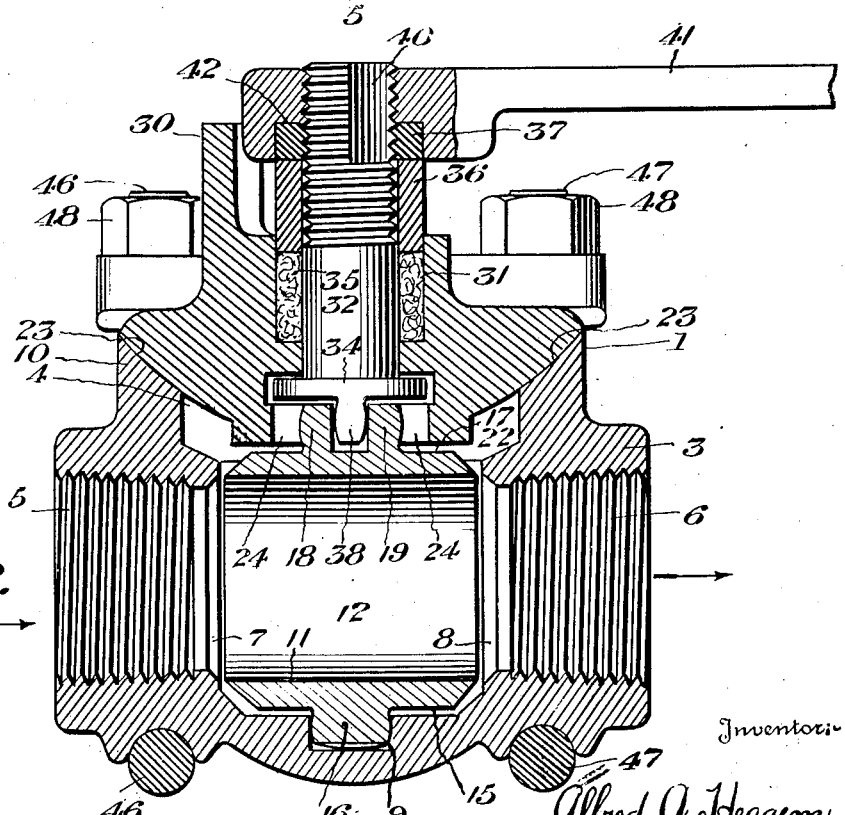
Figure 3:
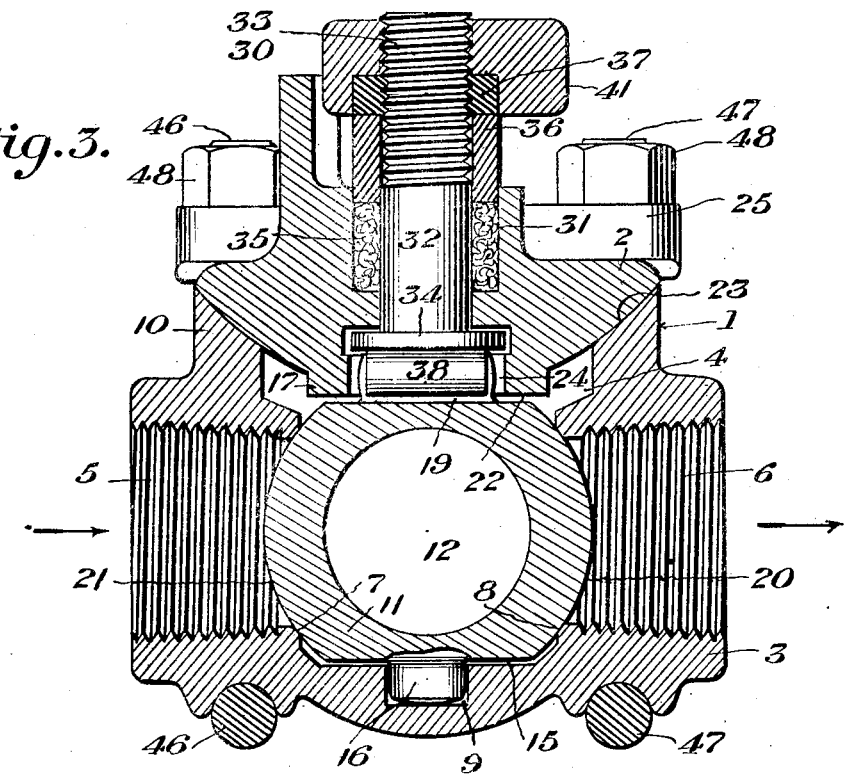
Figure 4:
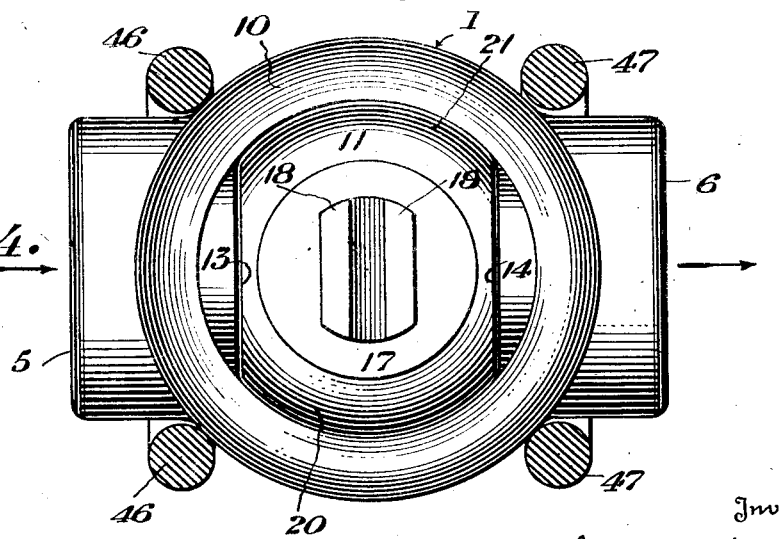
Figure 5:
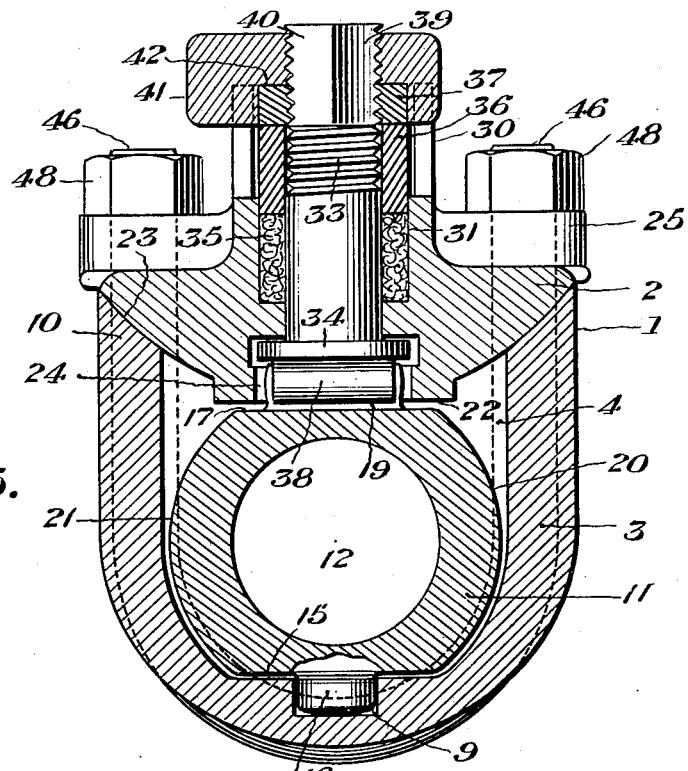
Figure 6:
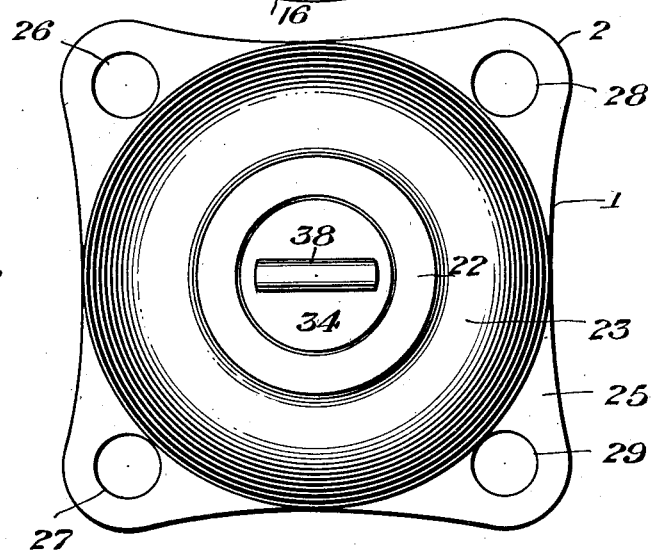

In the accompanying drawings forming a part of this specification and wherein, for the purpose of illustration, I have shown a preferred embodiment of my invention:

Figure 1 is a plan view of a valve embodying the features of my present invention, showing the position of the valve-operating handle when the valve is in open position, Figure 2 is a central, vertical sectional view of the valve showing the same in open position, Figure 3 is a central, vertical sectional view of the valve showing the same in closed position, Figure 4 is a top plan view of the lower section of the valve body or casing showing the valve core within the valve chamber and in closed position therein, the U-shaped clamping bolts for securing the two sections together being shown in transverse section, Figure 5 is a central, vertical sectional view of the valve on the line 5—5 of Figure 1, and Figure 6 is an inverted plan view of the upper section of the two-part valve casing.

In the accompanying drawings wherein like reference characters have been employed to designate like parts throughout the several views, the numeral I designates, broadly, the valve casing or body, comprising an upper section 2 and a lower section 3. The lower section 3 of the valve body or casing is provided with a circularly curved, open top chamber 4, communicating with which is an inlet passage 5 and outlet passage 6 for the inflow and outflow, respectively, of the fluid to be controlled by the valve. These passages 5 and 6 are disposed in axial alignment and are preferably interiorly threaded to permit the valve to be screwed onto a well casing, pipe or the like, this construction, because of the axial alignment of the inlet and outlet passages and the construction of the preferred valve core to be hereinafter described, being admirably suited for use as a well casing valve, where it is frequently desired to operate the bits or other drilling or pumping tools directly through the valve and without the necessity of removing the valve from the casing. The inlet and outlet passages 5 and 6 are preferably provided with machined valve seats 7 and 8 positioned at the inner ends of each passage. The wall defining the bottom of the chamber 4 is provided with a centrally located, circular recess 9, and the upper side of the lower section 3 is provided with a circular, upstanding flange 10, the upper surface of which is concaved inwardly toward the center of the chamber 4 as clearly shown in Figure 4 of the accompanying drawings.

The circular chamber 4 within the lower section 3 is open at the top to permit the introduction of a valve core 11, which core is formed with a passage 12 cylindrical throughout its length and of a diameter corresponding substantially to that of the passages 5 and 6 of the valve body section 3 so as to afford a straight, uninterrupted passage for fluid when the valve is in open position. The valve core 11 is preferably made from a spherical casting which is machined to provide the flat faces 13 and 14 disposed transversely to the passage 12, provided through the said spherical casting. The lower or bottom portion of the spherical casting or core 11 is machined to provide the flat portion 15 and a centrally-located, circular trunnion 16, the outer face of which is curved, this trunnion fitting within the recess 9 in the lower section 3 of the valve body or casing, with which it cooperates to permit rotary as well as limited tilting movement of the valve core 11 within the valve chamber 4. The upper portion of the spherical casting or core 11 is machined to provide the flat portion 17 and a pair of elongated, spaced and parallel upstanding lugs 18 and 19. It is to be particularly noted that the distance between the flat faces 13 and 14 of the substantially spherical valve core 11 is slightly less than the distances between the inner ends of the inlet and outlet passages 5 and 6, as clearly shown in Figure 4 of the accompanying drawings, whereby the said valve core may be turned so that the said flat side walls 13 and 14 extend transversely to the axis of the inlet and outlet openings and the core readily inserted within the valve chamber 4 through the open top thereof. The vertical distance between the bottom surface 15 and the upper surface 17 of the substantially spherical valve core 11 is greater than the diameter of the valve seats 7 and 8, and the curved, imperforate portions 20 and 21 of the valve core are of sufficient extent and curvature to engage the annular valve seats 7 and 8 when the valve core 11 is moved in a counter-clockwise direction for a quarter-turn from the position shown in Figure 4 to the position shown in Figure 3, i. e., the diameter of the spherical casting 11 from which the valve core is made is such that rotation of the core member about its vertical axis from the open to closed position of the valve will cause the said curved portions 20 and 21 to slide into frictional contact with the annular valve seats 8 and 7 respectively, it being understood that this contact between the curved surfaces 20 and 21 and their cooperating valve seats 8 and 7 is not a binding contact but is a sliding contact which permits ready rotation of the valve core from open to closed position.

The valve core 11 above described is rotatable with respect to the valve body or casing so as to bring its passage 12 into and out of axial alignment with the passages 5 and 6 of the valve body or casing, and said core is also capable of tilting or rocking about its vertical axis so as to cause the curved, imperforate surface 20 to be moved into proper cooperative relation with respect to the valve seat 8. When the valve is first made and installed, the diameter of the valve core casting 11 and the curvature of the imperforate surfaces 20 and 21 are such that there is established the proper sliding contact between the curved surfaces and the valve seats, but after long and continued use, the valve core surface 20 and the valve seat 8 will be worn down and, hence, it is important that means be provided to tilt or rock the valve core 11 about its vertical axis to compensate for the wear on the surface 20 and valve seat 8 to thus bring said surface into proper sliding contact with respect to the said valve seat. An important feature of my present invention resides in the novel means for effecting the aforesaid rotary and tilting movements of the valve core.

The upper section 2 of the valve body or casing 1, is provided with a flat, centrally-located, bottom portion 22, and a circular, convex portion 23, this convex portion 23 cooperating with the circular, concave surface at the upper edge of the circular, upstanding flange 10 on the lower section 3 of the valve body or casing. When the upper section 2 is placed in position on the lower section 3 with the convex and concave portions in engagement, as shown in Figure 2 for example, it will be obvious that the upper section can be canted or tilted in a manner such as to assume any one of a plurality of angular positions inclined with respect to the plane defined by the upper end of the flange 10 of the lower section 3. The flat bottom portion 22 of the upper section 2, is provided with a centrally-located circular chamber or recess 24, the spaced, upstanding lugs 18 and 19 of the valve core extending into this chamber and being rotatable therein when the two sections 2 and 3 of the valve body or casing are brought together. The lugs 18 and 19 fit snugly within the recess 24 and operatively engage the vertical wall thereof for limited movement transverse to the axis of rotation of the valve core, such movement being sufficient only to enable the pressure of the fluid to effect firm seating of the valve in the closed position thereof. Thus the position of the valve core with respect to the valve seat 8, to compensate for wear, may be determined by tilting or canting the upper casing section 2 as previously stated, it being noted that as shown in Figs. 3 and 5, the end walls or surfaces of the lugs 18 and 19 are slightly curved or arcuate to permit free rotation of the valve core in tilted positions of said upper casing section. The upper section 2 is provided in a plane above the convex portion 23, with a substantially square, radially-extending flange 25, the four corners of which are apertured as indicated by the reference numerals 26, 27, 28 and 29. The upper surface of the section 2 is provided with an arcuate, upstanding stop lug 30 for a purpose to be hereinafter described, and is also provided with a centrally located recess 31. A valve stem 32, having a threaded portion 33 at its upper end and a radially extending annular flange 34 at its lower end, is inserted upwardly through the chambers or recesses 24 and 31 until the annular flange 34 abuts the wall defining the top of the recess 24, and the joint between the valve stem and valve body is rendered fluid tight by means of a packing 35 compressed within the recess 31 by a cylindrical sleeve 36, the upper end of which is engaged by a hexagonal nut 37 threaded on the upper threaded end 33 of the valve stem 32. An elongated lug 38 depends from the annular flange 34 and extends transversely of the valve stem as clearly shown in the drawings, the side walls of this lug being slightly curved and the lug being of a sufficient width to fit between the upstanding lugs 18 and 19 on the valve core 11, it being obvious from a consideration of the drawings that rotation of the valve stem 32 will cause a corresponding rotation of the valve core 11 due to the engagement between the elongated lug 38 and the upstanding lugs 18 and 19. The upper end of the valve stem is cut away to form flat faces 39 and 40, and as a convenient means for rotating the valve stem 32, I provide an operating handle 41, one end of which is provided with an undercut hexagonal recess 42 which engages the hexagonal nut 37 and with a recess shaped to engage the upper end of the valve stem 32, the engagement between the flat faces 39 and 40 of the valve stem and the corresponding flat faces of the cooperating recess in the handle 41 effecting rotation of the valve stem as the handle is moved in a clockwise and/or counterclockwise direction. That end of the handle which contains the recess 42 above referred to has an arcuate cut-out portion terminating in shoulders 43 and 44 adapted to engage opposite ends of the arcuate stop lug 30 to limit rotation of the handle. The opposite end of the handle 41 is provided with a hexagonal recess 45 which may be engaged with the hexagonal nut 37 when it is desired to force the nut downwardly along the valve stem 32 to compress the packing 35 in the recess 31, or to remove said nut from the valve stem when it becomes necessary or desirable to renew the packing 35 or to disassemble the valve operating mechanism.

In addition to the construction above described, I provide a pair of U-shaped clamping bolts 46 and 47 for rigidly clamping the two sections 2 and 3 of the valve body or casing together and for permitting the angular adjustment of the upper section 2 with respect to the lower section 3 and the valve core 11 contained therein. These U-shaped bolts 46 and 47 are engaged beneath the lower section 3 and have their upper threaded ends passed through the apertures 26, 27 and 28, 29, respectively, suitable nuts 48 being provided at the upper threaded ends of said bolts which nuts, upon tightening, force the concave and convex meeting surfaces of the two sections into intimate and leak-proof contact, and, upon loosening, permit universal movement of the upper section 2 with respect to the lower section 3.

To assemble the valve and operating mechanism within the valve body or casing, the valve core 11 is turned to a position such that the passage 12 therethrough extends in alignment with the inlet and outlet passages 5 and 6. In this position the core may be readily introduced into the chamber 4 and will occupy a position corresponding to that shown in Figure 4 of the accompanying drawings, with the trunnion 16 resting within the recess 9. The valve stem 32 is inserted through the recesses 24 and 31 until the annular flange 34 abuts against the wall defining the top of the recess 24. Packing material 35 is then inserted within the recess 31 at the upper side of section 2 of the valve body or casing; the cylindrical sleeve 36 is passed over the upper end of the valve stem 32; and the hexagonal nut 37 is screwed onto the valve stem 32 to compress the packing 35 within the recess 31, the recess 45 at the end of the handle 41 constituting a convenient means for actuating the hexagonal nut 37. The upper section 2 is then applied to the lower section 3 with the depending lug 38 positioned between the upstanding lugs 18 and 19, whereupon the U-shaped clamping bolts 46 and 47 are passed beneath the section 3 with their upper ends passing through the apertures 26, 27 and 28, 29, respectively, in the flange 25. Nuts 48 are then applied to the upper threaded ends of the bolts 46 and 47 and are screwed down tightly and evenly so that the vertical axis of the upper section 2 and the valve stem 32 therein coincide with the vertical axis of the valve core 11. As above stated, the diameter of the substantially spherical valve core 11 and the curvature of the imperforate surfaces 20 and 21 with respect to the valve seats 7 and 8, are such that there is established the proper sliding contact between the said curved surfaces and the said valve seats when the valve core is rotated to open or closed position. The operating handle 41 is then applied to the upper end of the valve stem 32 with the hexagonal nut 37 positioned within the hexagonal undercut recess 42 and the flattened faces 39 and 40 engaging corresponding faces on the recess in the handle. In this position the shoulder 44 adjacent which the letters "OP" appear is in contact with that end of the arcuate stop lug 30 bearing the letters "EN", thus indicating to the operator that the valve is in open position, i. e., in the position shown in Figures 1, 2 and 5 of the accompanying drawings.

Referring now to the operation of the valve construction above described, and assuming that the valve is in open position, rotation of the operating handle 41 in a counterclockwise direction will cause a corresponding rotation of the valve stem 32 and, due to the engagement between the elongated lug 38 and the upstanding shoulders 18 and 19 on the upper surfaces of the valve core 11, the valve core 11 will rotate about its trunnion to position the passage 12 of the said core transversely of the passages 5 and 6 and to dispose the valve faces 20 and 21 adjacent the valve seats 8 and 7 respectively. When the counterclockwise rotation of the handle 41 has progressed through approximately 90 degrees, the shoulder 43 adjacent which the letters "UT" appear, contacts the end of the arcuate stop lug 30 bearing the letters "SH", thus indicating to the operator that the valve is in closed position, i. e., in the position shown in Figure 3 of the accompanying drawings. During the rotation of the valve core 11 from the open to closed position, the curved surfaces 20 and 21 slide across the valve seats 8 and 7 respectively, the contact being a close, sliding fit which permits ready rotation of the valve core. When the valve core 11 is moved to the position shown in Figure 3, the pressure of the fluid entering the inlet passage 5 will be effective on the surface 21 and will positively force the surface 20 into sealing contact with the cooperating valve seat 8, it being noted that when the valve core 11 is in closed position, the upstanding lugs 18 and 19 and the depending lug 38 positioned therebetween, are in axial alignment with the axis of the inlet and outlet passages 5 and 6 and, hence, the valve core is free to partake of limited tilting movement about its trunnion 16, limited tilting movement is occasioned by the pressure of the fluid on the imperforate surface 21 adjacent the inlet passage 5. When the valve is new, it is to be understood that the tilting movement above described is very slight, due to the fact that the diameter of the said spherical member is such that there will be a very limited movement of the valve core 11 between the curved surfaces of the valve seats 20 and 21, respectively.

During the rotation of the valve core into firm contact with the valve seat 8, whereupon the component parts assume the closed position shown in Figure 3.

The limited tilting movement 20 into the open space between the curved surface of the valve seats 8 and 7, their cooperating valve seats 8 with the component member between the curved surface 20 into the valve is the fact that the diameter of the open position, i. e., closed position 11 forces the valve core 11 from its engagement with the hexagonal nut 37 will be rotated with the valve stem 32, due to its rotation in the handle 41, and hence of the hexagonal recess 42 in the rotation of clockwise there will be no relative rotation between the valve stem and nut which would disturb the packing 35.

When it is desired to open the valve from the closed position shown there is a condition of fluid therethrough, i. e., when it is pressed it is desired to move the valve 12 of the flow of fluid therethrough, the upstand 5 tion shown in Figure 2, the handle 41 is moved to the position shown to cause a corresponding rotation of the valve stem 32 and lug 38 and the upper surface of in direction 2, the handle 3 to the passage of the handle between the elongated lug 38 on the valve of the valve stem 18 and 19 on the passages 5 the shoulders 18 and 19 in alignment with the arch 30 ing core 11 in alignment with the letters "EN", thus its trunnion 44 through approximately 90 wise rotation of the said core 11, clockwise rotation of the end of the lettersaid core 11 the shoulder 46 adjacent thereof valve and 6. When has progressed valve. Dur- 35 41 has progressed that the valve is in bearing the letters shown in the appear, contacts the position of the drawings sliding 40 the operator drawings. During the core 11 from the accompanying position of the core 11 sliding surfaces curved surfaces 8 and 7 ...

as a preferred embodiment of the same and that various changes may be made in the size, shape and arrangement of parts, without departing from the spirit of my invention or the scope of the subjoined claims.

What I claim is:

1. In a valve, a two-part valve casing comprising a lower section having an inlet and an outlet opening, a valve chamber communicating with said openings, and a valve core journalled within said chamber for rotary and tilting movements therein; an upper casing section having a portion engaging said valve core to define the axis of rotation thereof, said upper section being angularly adjustable with respect to the said lower section to cause said valve core to tilt within said valve chamber; and means for rotating said valve core with respect to the inlet and outlet openings to control the flow of fluid through the valve.

2. In a valve, a two-part valve casing comprising a lower section having an inlet and an outlet opening, a valve chamber communicating with said openings, and a valve core journalled within said chamber for rotary and tilting movements therein; an upper casing section having a portion engaging said valve core to define the axis of rotation thereof, said upper section being angularly adjustable with respect to said lower section to cause said valve core to tilt within said valve chamber; means for clamping said sections together in the desired angular position; and means for rotating said valve core with respect to the inlet and outlet openings to control the flow of fluid through the valve.

3. In a valve, a two-part valve casing comprising a lower section having an inlet and an outlet opening, a valve chamber communicating with said openings, and a valve core journalled within said chamber for rotary and tilting movements therein; an upper casing section having a portion engaging said valve core to define the axis of rotation thereof, said upper section being angularly adjustable with respect to said lower section to cause said valve core to tilt within said valve chamber; clamping bolts engaging said upper and lower sections for clamping said sections together in the desired angular position; and means for rotating said valve core with respect to the inlet and outlet openings to control the flow of fluid through the valve.

4. In a valve, a two-part valve casing comprising a lower section having an inlet and an outlet opening, a valve chamber communicating with said openings, and a valve core journalled within said chamber for rotary and tilting movements therein; an upper section having a valve stem therein engaging the valve core for rotating said core with respect to the inlet and outlet openings to control the flow of fluid through the valve, said upper section being angularly adjustable with respect to said lower section to cause said valve core to tilt within said valve chamber, and said upper section having an apertured flange; and clamping bolts engaging said lower section and extending through the apertures in said flange for clamping the two sections together in the desired angular position.

5. In a valve, a two-part valve casing comprising a lower section having an inlet and an outlet opening, a valve chamber communicating with said opening, and a valve core journalled within said chamber for rotary and tilting movements therein; an upper section having a valve stem therein engaging the valve core for rotating said core with respect to the inlet and outlet openings to control the flow of fluid through the valve, said upper section being angularly adjustable with respect to said lower section to cause said valve core to tilt within said valve chamber and said upper section having a radially-extending flange provided with pairs of spaced apertures disposed on opposite sides of the valve stem; and a pair of U-shaped clamping bolts engaged beneath the lower section and having their ends extending through the pairs of apertures in the flange on opposite sides of the valve stem for clamping the two sections together in the desired angular position.

6. In a valve, a two-part valve casing comprising a lower section having an inlet and an outlet opening, a valve seat surrounding said outlet opening, a valve chamber communicating with said openings, and a valve core journalled within said valve chamber for rotary and tilting movements therein; an upper casing section having a portion engaging said valve core to define the axis of rotation thereof, said upper section being angularly adjustable with respect to said lower section to tilt the valve core with respect to the valve seat; and means for rotating the valve core with respect to the valve seat to control the flow of fluid through the outlet opening.

7. In a valve, a two-part valve casing comprising a lower section having an inlet and an outlet opening, a valve seat surrounding said outlet opening, a valve chamber communicating with said openings, and a valve core journalled within said valve chamber for rotary and tilting movements therein; an upper casing section having a portion engaging said valve core to define the axis of rotation thereof; said upper and lower sections having cooperating concave and convex meeting surfaces whereby they are angularly adjustable with respect to each other, the angular position of said sections determining the relative angular position between said valve core and said valve seat; and means for rotating the valve core with respect to the valve seat to control the flow of fluid through the outlet opening.

8. In a valve, a two-part valve casing comprising a lower section having an inlet and an outlet opening, a valve seat surrounding said outlet opening, a valve chamber communicating with said openings, and a valve core journalled within said valve chamber and rotatable with respect to said valve seat to control the flow of fluid through the outlet opening, said valve core being tiltable with respect to said valve seat, and said lower section having a concave upper surface; and an upper section having a valve stem therein engaging the valve core for rotating said core, said upper section having a convex lower surface to cooperate with the concave surface of the lower section to permit angular adjustment of said upper section with respect to said lower section, the angular position of said sections determining the relative angular position between said valve core and said valve seat.

9. In a valve, a two-part valve casing comprising a lower section having an inlet and an outlet opening, a valve seat surrounding said outlet opening, a valve chamber communicating with said openings, and a valve core journalled within said valve chamber and rotatable with respect to said valve seat to control the flow of fluid through the outlet opening, said valve core being tiltable with respect to said valve seat; an upper section having a valve stem therein engaging the valve core for rotating said valve core, said sections having cooperating concave and convex meeting surfaces whereby they are angularly adjustable with respect to each other, said upper section having an apertured flange above the cooperating concave and convex meeting surfaces; and clamping bolts engaging said lower section and extending through the apertures in said flange for clamping the two sections together in the desired angular position, the angular position of said sections determining the relative angular position between said valve core and said valve seat.

10. In a valve, a two-part valve casing comprising a lower section having an inlet and an outlet opening, a valve chamber communicating with said openings, and a valve core journalled within said chamber for rotary and tilting movements therein, said valve core having a pair of spaced lugs extending upwardly therefrom; and an upper section having a valve stem therein including a depending lug positioned between the spaced lugs on the valve core, whereby rotation of said valve stem will effect a corresponding rotation of said valve core to control the flow of fluid through the valve, said upper section being angularly adjustable with respect to said lower section to cause said valve core to tilt within said valve chamber.

11. In a valve, a two-part valve casing comprising a lower section having an inlet and an outlet opening, a valve chamber communicating with said openings, and a valve core journalled within said chamber for rotary and tilting movements therein, said valve core having a lower trunnion seated within a recess in the wall defining the bottom of said valve chamber, and an upper trunnion extending into the space above said valve chamber; and an upper section having a valve stem therein operatively engaging the upper trunnion on the valve core, whereby rotation of said valve stem will effect a corresponding rotation of said valve core to control the flow of fluid through the valve, said upper section being angularly adjustable with respect to said lower section whereby the engagement between the valve stem and upper trunnion will cause said valve core to tilt about its lower trunnion, the angular position of said sections determining the relative angular position of said valve core within said valve chamber.

12. In a valve, a two-part valve casing comprising a lower section having an inlet and an outlet opening, a valve chamber communicating with said openings, and a valve core journalled within said valve chamber for rotary and tilting movements therein, said valve core having a lower trunnion seated within a recess in the wall defining the bottom of said valve chamber and an upper trunnion extending into the space above said valve chamber, and said lower section having a circular, upstanding flange which extends above the top of the upper trunnion on the valve core, the upper surface of this flange being concaved toward the center of the valve core; an upper section having a valve stem therein operatively engaging the upper trunnion on the valve core, whereby rotation of said valve stem will effect a corresponding rotation of said valve core to control the flow of fluid through the valve, said upper section having a convex lower surface to cooperate with the concave surface of the lower section to permit angular adjustment of said upper section with respect to said lower section whereby the engagement between the valve stem and upper trunnion will cause said valve core to tilt about its lower trunnion, the angular position of said sections determining the relative angular position of said valve core within said valve chamber; and means for clamping said upper and lower sections together in the desired angular position.

13. In a valve, a valve casing comprising plural casing sections, a valve core mounted within the valve casing for rotary and tilting movements, said valve core including trunnion portions journalled respectively in said casing sections, means for relatively shifting said casing sections to tilt the valve core within the casing, and means for rotating the valve core.

14. In a valve, a valve casing having inlet and outlet passages, a valve core mounted within the valve casing for rotary and tilting movements, said casing including a part capable of being canted angularly with respect to the axis of rotation of the valve core and having operative engagement with the valve core to tilt the same about an axis transverse to the axis of rotation thereof, and means for rotating the valve core.

15. In a valve, a valve casing comprising cooperating casing sections defining a chamber having inlet and outlet passages, a valve core mounted within the valve casing for rotary and tilting movements, said valve core being provided with opposed trunnions, trunnion guide means on each of said valve casing sections, and repsectively engaging a trunnion on the valve core, means for relatively tilting one of the casing sections to tilt the valve core, and means for rotating the valve core.

16. In a valve, a valve casing comprising cooperating casing sections defining a chamber having inlet and outlet passages, a valve core mounted within the valve casing for rotary and tilting movements, said valve core being provided with opposed trunnions, trunnion guide means on each of said valve casing sections, and respectively engaging a trunnion on the valve core, means for relatively tilting one of the casing sections to tilt the valve core, and means including a rotatable member having a universal driving connection with the valve core for rotating the same.

ALFRED G. HEGGEM.